United States Patent
Croswell et al.

(10) Patent No.: US 6,609,038 B1
(45) Date of Patent: Aug. 19, 2003

(54) MULTI-MEDIA ENHANCED PROGRAM CONTROLLED MACHINE

(75) Inventors: Fred James Croswell, Felicity, OH (US); Ronald M. Sparer, Loveland, OH (US); William A. Reinhart, Georgetown, OH (US)

(73) Assignee: Milacron Inc., Cincinnati, OH (US)

( * ) Notice: Subject to any disclaimer, the term of this patent is extended or adjusted under 35 U.S.C. 154(b) by 360 days.

(21) Appl. No.: 09/658,888

(22) Filed: Sep. 11, 2000

(51) Int. Cl.⁷ .............................................. G05B 15/00
(52) U.S. Cl. .............................. 700/83; 700/86; 700/88; 700/197; 700/180; 700/181; 345/716; 345/719; 345/720; 345/727; 345/730; 345/705; 345/706; 345/707; 345/708; 345/709; 345/547; 345/555; 345/556; 345/965; 345/770; 345/771; 345/970; 345/972
(58) Field of Search ........................... 700/83, 86, 88, 700/197, 180, 181; 345/716, 719, 720, 727, 730, 705–709, 547, 555, 556, 965, 770, 771, 970, 972

(56) References Cited

U.S. PATENT DOCUMENTS

| | | | |
|---|---|---|---|
| 4,674,053 A | 6/1987 | Bannai et al. | |
| 4,802,097 A | 1/1989 | Tanaka et al. | |
| 4,823,274 A | 4/1989 | Kiya et al. | |
| 5,062,784 A | 11/1991 | Inaba et al. | |
| 5,680,323 A | * 10/1997 | Barnard | 345/705 |
| 5,734,804 A | 3/1998 | Bergner | |
| 5,864,482 A | * 1/1999 | Hazama et al. | 700/95 |
| 5,898,591 A | 4/1999 | Hettinga et al. | |
| 5,949,676 A | 9/1999 | Elsley | |
| 5,995,936 A | 11/1999 | Brais et al. | |
| 6,112,133 A | 8/2000 | Fishman | |
| 6,211,870 B1 | 4/2001 | Foster | |
| 6,215,822 B1 | 4/2001 | Bose et al. | |
| 6,262,724 B1 | * 7/2001 | Crow et al. | 345/723 |
| 6,377,863 B1 | * 4/2002 | Koontz et al. | 700/197 |
| 2002/0026264 A1 | * 2/2002 | Choi | 700/197 |

* cited by examiner

Primary Examiner—Ramesh Patel
Assistant Examiner—Thomas Pham
(74) Attorney, Agent, or Firm—John W. Gregg

(57) ABSTRACT

A program controlled machine wherein signals produced in response to execution of programs control operation of machine devices includes a control for storage, retrieval and presentation of audio/video information. The control includes devices for presentation of audio/video information and stored programs including programs for enabling storage of audio/video information files while the machine is in a manual mode of operation and programs for controlling the presentation by the audio/video presentation devices of selected audio/video information from the stored files. The control provides facilities for recording audio/video information and for manually controlled presentation of audio/video information as well as for automatic presentation of audio/video information in response to detection of occurrence of a particular event.

17 Claims, 3 Drawing Sheets

MULTI-MEDIA ENHANCED PROGRAM CONTROLLED MACHINE

BACKGROUND OF THE INVENTION

I. Field of the Invention

This invention relates to program controlled machines. In particular, this invention relates to program controlled machines wherein signals produced in response to execution of programs by a programmed control effect operation of machine devices.

II. Description of Related Art

It is known in the art of program controlled machines, including plastic processing machines, to provide control facilities for using pre-recorded data for set-up, that is, for preparation of the machine and related equipment for production, and advantageously data associated with particular products. Such set-up data, determined for a particular machine in the course of an actual set-up procedure, may be recorded on transportable media, in a data storage device incorporated in the machine control or in a remotely accessible data storage device to which the machine control may be connected, for example. In addition, it is known in the art of machine controls to provide facilities for monitoring machine conditions during operation. As is conventional, such facilities periodically update status signals representing, for example, the results produced by processing condition monitoring algorithms using then current values of signals representing conditions of devices and elements of the machinery and associated equipment. It is typical of such monitoring facilities to use the status signals to activate indicators for the attention of operators or others.

Known systems for storing, retrieving, and presenting set up data are generally limited to storing of numeric information used as "set-point values", i.e., desired parameter values such as temperature, velocity, time and so forth used to control machine cycles of operation. It is also known to provide facilities for storage and presentation of text messages, advantageously displayable on a machine control display device, for reference during machine set-up. Known systems for storing, retrieving and presenting information used for machine set-up and the like do not include facilities for storing, retrieving and presenting audio and/or video information using so-called multi-media facilities available for personal computers. Likewise, known systems for monitoring machine conditions during operation do not include facilities for storing, retrieving, and presenting video or audio information in response to conditions of status signals.

SUMMARY OF THE INVENTION

It is an object of the present invention to provide facilities for storing, retrieving and presenting audio and/or video information in connection with machine operation.

It is a further object of the present invention to provide a machine control having means for storing, retrieving and presenting video and/or audio information in connection with set-up of a machine and associated equipment for production.

It is a still further object of the present invention to provide a machine control having means for storing, retrieving and presenting video and/or audio information in response to occurrence of particular events in connection with control of a machine.

Further objects and advantages of the invention shall be made apparent from the accompanying drawings and the following description thereof.

In accordance with the aforesaid objects the present invention provides an electronic notepad function associated with set-up facilities of a machine control to store audio and video files for presentation of audio and video information during set-up of a machine and related equipment. Audio/video files may be retrieved from transportable media or from remotely connected devices, and, with appropriate devices connected, audio and/or video recordings can be created at the machine control and stored as audio/video files. The electronic notepad function enables a user to store files of audio and/or video information in association with a unique identifier, for example, a mold data file identifier. The stored files can be subsequently replayed during set-up of the machine and related equipment. An electronic counselor function enables a user to store files of audio and video information for automatic presentation in response to the occurrence of particular events as represented by predetermined conditions of status signals.

DETAILED DESCRIPTION OF THE PREFERRED EMBODIMENT

To illustrate the invention, a machine and control of a preferred embodiment shall be described in detail. While the machine of the preferred embodiment is an injection molding machine, it is not the intention of the applicants to limit the scope of the invention to injection molding machines or controls therefore, it being expressly contemplated that the invention is equally well suited to controls of other machines, and particularly to controls for other plastics processing machines and associated equipment, including without limitation, blow molding machines, extruders, extrusion blow molding machines and the like.

Plastics Processing Machine & Equipment

Figure 1:
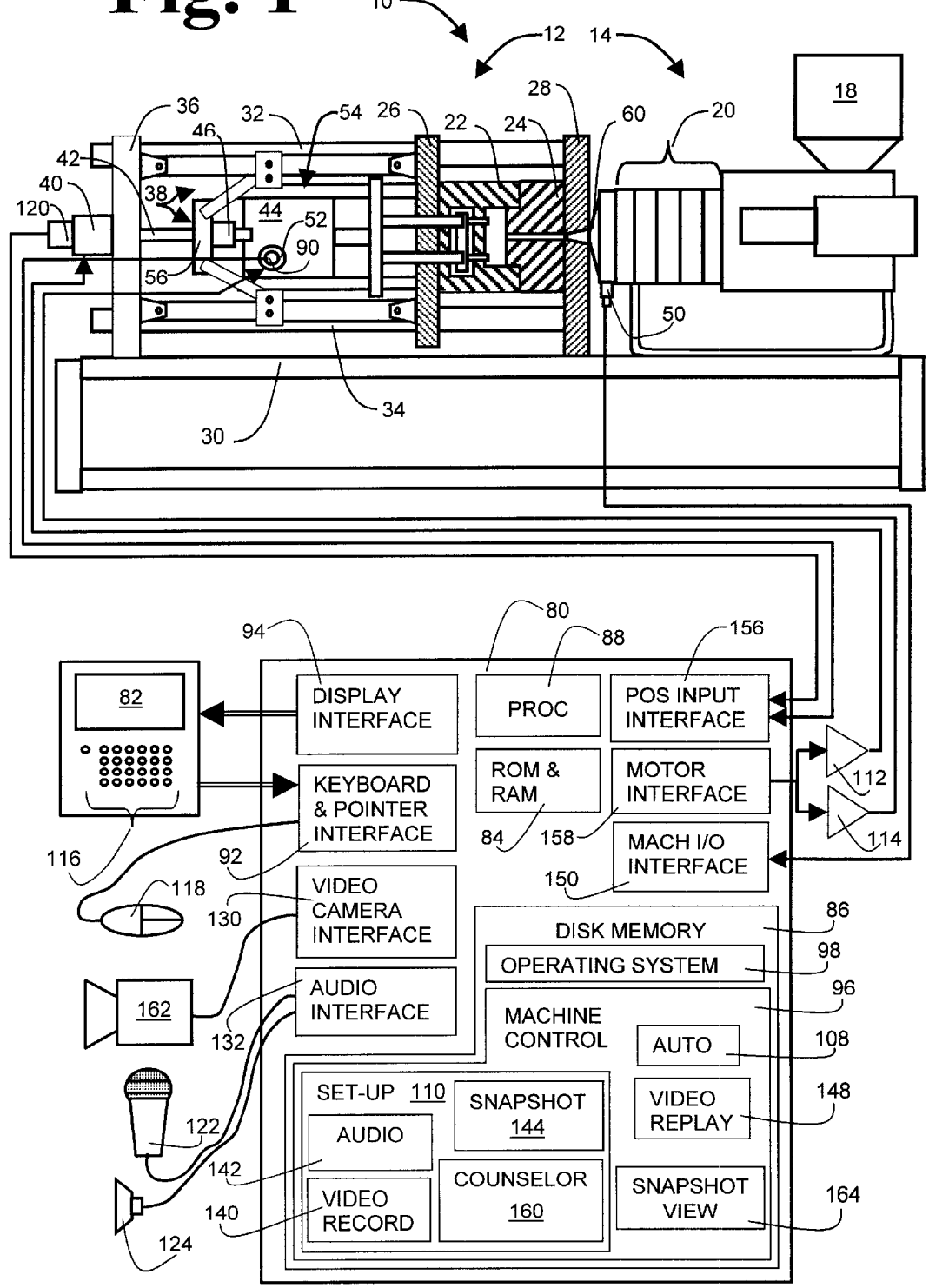
FIG. 1 is a block diagram of an injection molding machine and control in accordance with the invention.

Referring to FIG. 1, an injection molding machine 10 includes a clamp assembly 12 and an injection unit 14. Typical of plastic injection molding machines, raw material in the form of pellets and/or powders is introduced to injection unit 14 through hopper 18. Injection unit 14 includes a barrel portion 60, typically surrounded by external heating elements 20, and an internal material working screw, not shown. As raw material is melted, i.e. plasticized, by a combination of heating and material working, the plasticized material is conveyed toward the exit end of injection unit 14, displacing the interior screw away from clamp assembly 12. Once a sufficient volume of material has been plasticized, the working screw is advanced within barrel portion 60 to force material through the exit into a cavity defined by mating mold sections 22 and 24. Clamp assembly 12 holds mold sections 22 and 24 together during injection and thereafter until the injected material has sufficiently solidified to be removed without unacceptable deformation. Movable platen 26 is then retracted, separating mold section 22 from mold section 24 to permit release of the molded article.

Continuing with reference to FIG. 1, clamp assembly 12 comprises fixed platen 28, movable platen 26, thrust or "die height" platen 36 and toggle mechanism 38. Fixed platen 28 supports mold section 24 and is rigidly mounted to machine base 30. Strain rod pairs 32 and 34 are supported at opposite ends by fixed platen 28 and thrust or die height platen 36. Movable platen 26 is slidably supported on strain rod pairs 32 and 34 for reciprocation between "open" and "closed" positions, "closed" referring to the advanced position as shown in FIG. 1. A toggle link mechanism 38, interposed between movable platen 26 and thrust platen 36, is operated by a low friction screw and nut combination comprising screw 42 and nut 46. Screw 42 is rotated by motor 40 through a transmission providing mechanical advantage, by, for example, reducing gears or belt driven pulleys, or combinations of the foregoing, as is well known. A toggle link crosshead 56 is mounted to move with nut 46. Alternatively, reciprocation of toggle link crosshead 56 may be effected by a motor driven rack and pinion combination as is well known. Toggle link mechanism 38 is preferably operable to a "lock-over" configuration, as shown in FIG. 1 wherein serial pivoting links between thrust platen 36 and movable platen 26 are longitudinally aligned. On opening, reciprocation of crosshead 56 pivots these links to reduce the effective length spanned by the links and draw movable platen 26 away from fixed platen 28.

The combination of screw 42 and toggle link mechanism 38 provides sufficient mechanical advantage to convert torque at motor 40 to the desired clamping force. As is conventional, motor 40 is preferably a servo-motor and includes or works in combination with a position measuring transducer 120 which produces electrical signals representing position of the motor armature. In the configuration illustrated in FIG. 1, position transducer 120 may be an encoder for measuring angular position of an armature of motor 40. Were motor 40 a linear motor, position transducer 120 could as well measure linear position of the motor armature. Alternatively, position transducer 120 may measure linear displacement and be mechanically coupled to crosshead 56.

Continuing with reference to FIG. 1, a power operated ejector mechanism 54 is illustrated in FIG. 1 disposed between thrust platen 36 and movable platen 26. Ejector mechanism 54 effects translation of movable members in mold section 22 to dislodge an article from mold section 22. Motor 52 provides motive force for ejector mechanism 54 through transmission 44. Motor 52 is mounted to and supported by transmission 44 which is fixably supported by movable platen 26 so that transmission 44 and motor 52 move with movable platen 26.

As shown in FIG. 1, motor 52 is a rotating machine, wherein an armature and stator are arranged for rotation of one relative to the other. As is conventional, motor 52 is preferably a servo-motor and includes or works in combination with a position measuring transducer 90 which measures relative angular position. Also, as is well known for control of servo motors, other transducers may be used with motor 52 to measure, for example, angular velocity or to detect motor element relative locations for motor current commutation. Transmission 44 converts rotation of the armature of motor 52 to translation for reciprocation of ejector pins in mold section 22. The motion conversion of transmission 44 and the operation of transducer 90 are such that position of an armature of ejector mechanism 54 within its range of translatory motion can be unambiguously determined from measurement of angular position by position transducer 90. In the configuration illustrated in FIG. 1, position transducer 90 may be an angular position encoder.

It is well known in the art of injection molding to use associated peripheral equipment such as, for example, material dryers, parts handlers, material conveyors, and inspection subsystems. In addition, it is well known in the art of injection molding to use active tooling components such as mold heaters and hot-runner sub-systems. While no peripheral equipment or active tooling components are illustrated in FIG. 1, the present invention contemplates storage of data representing information associated with use of such equipment and components.

Control

Control systems suitable for use in connection with the present invention are program controlled. The preferred embodiment of such control systems are "open architecture" personal computer based systems. A principle characterizing feature of "open architecture" systems is that information regarding hardware and software interfaces for the computer system are publicly available facilitating supply of compatible software (computer programs) and hardware (devices) by sources independent of the producer of the computer system. Compatible software includes operating system programs such as, but not limited to, the WINDOWS family of programs available from Microsoft Corp. and a wide variety of application programs providing information processing functions from data collection and analysis to word processing. Compatible hardware range from individual circuit elements to complete functional elements such as so called "sound cards" which may be advantageously added as internal components of the personal computer system. By virtue of the standardized manner software and hardware can be installed, mechanism control functions implemented as proprietary programs can be supplied for the open architecture environment.

A preferred embodiment of a control system for an injection molding machine shall be described with reference to FIG. 1. Control system 80 comprises a mass data storage device such as disk memory 86, at least one processor 88, random access memory ("RAM") and/or read only memory ("ROM") 84, and interfaces 94 and 92 for, respectively, a display device 82, keyboard 116, and a pointing device 118 such as a "mouse". Additional interface circuitry is included for connection to peripheral devices such as printers, and other input and output devices which incorporate interface and control components to support signal exchanges with control system 80. The elements of control system 80 are interconnected by one or more "busses", typically conforming to industry standards. While shown as a disk memory, other types of non-volatile memory may be used, such as, for example, magnetic tape, optical disk, or non-volatile semiconductor memory. While processor 88 is illustrated as a single element, as used in this description and the appended claims, "processor 88" or "processor" shall be deemed to represent one or more microprocessors, so-called "co-processors", and the like, for executing programs stored in memory 84 and disk memory 86.

Machine control 80 produces signals for controlling the operation of machine devices, such as motors 40 and 52 which actuate mechanisms of the injection molding machine, heaters 20 and other devices not shown but typical of such machines and associated equipment. Output signals defining, for example, position, velocity, and/or acceleration are conditioned as appropriate at motor interface circuits 158 and applied to motor drives 112 and 114 to control electrical current delivered to motors 40 and 52 from a suitable power source. As is conventional, signals produced by position transducers 120 and 90 are used for control of motors 40 and 52. Outputs of transducers 120 and 90 are conditioned for use by control 80 by position interface circuits 156.

The present invention is directed to storage, retrieval and presentation of audio and/or video information. As used herein and in the appended claims "audio/video information" will refer to audio information only, video information only and the combination of audio and video information. As used herein and in the appended claims "presentation" of audio/video information shall refer to the production of sound in response to audio information, the display of images in response to video information and, as applicable, the combination of production of sound and display of images. As used herein, "recording" shall refer to creating a record, or the record created, of signals derived from sounds or images. As used herein, "file" shall refer to a data record together with associated information defining the location and/or size of records comprising the file. As used herein, "files" of audio and video information may be derived from recordings of actual sounds or images, or may comprise audio or video information which is derived from manual composition or otherwise created, together with information defining the location of and/or size of records comprising the files.

To support recording of audio information, an audio transducer, such as microphone 122, that converts sounds to electrical signals, is connected to audio interface circuits 132, for example, a conventional "sound card" for a personal computer. Audio interface circuits 132 include circuitry for conditioning and/or converting analogue signals input via microphone 122 to digital representations of the sound. Advantageously, conventional "sound card" interface circuitry includes elements reproducing sound, including speakers and or amplifiers for connection to external speakers such as speaker 124. To support recording of video information, a video camera 162 that produces electrical signals from an image field is connected to control 80 via, for example, video interface circuits 130. Advantageously, video interface circuits 130 may comprise a conventional "parallel port" used for connection of printers to personal computers. In any case, interface circuits 130 permit transfer of digitized image information from camera 162 for storage at for example RAM 84 or disk memory 86. Video information comprising pre-recorded files or video information from video camera 162 is presented for viewing on display device 82.

As is conventional, data processing functions performed by machine control 80 are controlled by operating system programs, some of which may be recorded in ROM 84 and others, including open architecture operating system programs 98, may be stored in memory 86. Operating system programs 98 control the execution of "application" programs such as machine control programs 96 by processor 88.

Machine control programs 96 perform logical and arithmetic functions to monitor and control the operation of machine elements and, typically, to enable or initiate the operation of peripheral equipment and/or active tooling components. Typically, such programs permit at least two modes of operation: (i) an automatic mode for normal production; and (ii) a set-up or manual mode, for preparing the machine, peripheral equipment and tooling components for production and for setting parameter values used by the machine control programs in production of particular articles from particular material. The automatic mode of operation is associated with "AUTO" programs 108 of FIG. 1, and the set-up or manual mode of operation is associated with the "SET-UP" programs 110. For purposes hereof, and as used in the appended claims, "manual mode" shall mean operation of machine 10 and control 80 in a manner that permits storage and/or creation of audio/video information files as described herein, regardless of whether the machine is concurrently operating to produce articles under program control. Hence, while it is known to have mutually exclusive modes of operation, i.e., a manual or "set-up" mode, and an automatic mode, it is not the intention of applicants that the invention be limited to such known implementations of "manual" modes of operation of machines. The following description will be made with reference to FIGS. 2–6 representing screen displays presented on display device 82 under control of particular programs as will be described. The screen displays advantageously provide representations of pushbuttons or other manually operable elements which may be "operated" by means of pointing device ("mouse") 118, i.e., by locating a "pointer" icon in the screen display to overlap a pushbutton display, and operating a switch associated with pointing device 118. As is conventional, the operation of the mouse switch will effect a change of appearance of the pushbutton display indicative of "operation" of the pushbutton depicted, and the controlling programs will respond functionally.

Controls of the preferred embodiment provide facilities for storing mold (tooling) data files using file saving facilities that permit association of such files with unique tooling (mold data) identifiers. File saving facilities suitable for this purpose include conventional "File Save" functions of WINDOWS operating system programs which support file naming and specification of the file saving "path", i.e., the hierarchy of directories and sub-directories under which the file is to reside. In the preferred embodiment, unique mold data identifiers are used as sub-directory names to contain all data files associated with the identified mold (tooling). While such unique identifiers are advantageously employed in molding machines, it will be appreciated that other types of machines may as well use other unique identifiers which may be advantageously used to associate data pertaining to tooling, fixtures, workpieces and finished products. As used herein and the appended claims, "tooling identifier" or "unique identifier" shall be deemed to refer to any such identifier known for use in connection with set-up of the particular type of machine and associated equipment. It is known to store text files in this manner, and the present invention contemplates storage of audio and video information files as an enhancement of the known mold data files stored in association with a unique identifier. Control facilities are provided to make a single mold data identifier "active" to enable access to associated data files in both set-up and automatic modes of operation of control 80.

Two facilities for use of stored audio and video information shall be described. One permits association of stored audio and video information with a unique identifier stored in control 80. A "notepad" function of set-up facilities is used to control presentation of such pre-recorded audio and video information as an aid to preparing the machine and related equipment for production. A second facility, implemented as an "electronic counselor", controls automated presentation of stored audio/video information on the occurrence of a particular event, indicating for example, a need for manual intervention such as to perform maintenance, to replenish material supplies, or to attend to a detected malfunction.

Audio/Video Notepad
Recording and Saving

Figure 2:
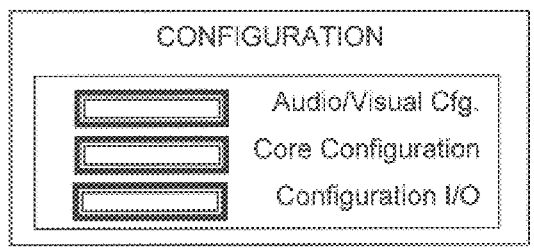
FIGS. 2–3c are illustrations of screen displays of the control of FIG. 1 related to recording of audio and video information.

To record audio and video information for access via the notepad function of set-up facilities, control 80 is placed in a "set-up" mode of operation wherein control 80 is operated under control of Set-Up programs 110. In the preferred embodiment, applicants have made the recording function accessible through a menu that includes other functions relating to configuration of the machine and equipment for production. A "CONFIGURATION" item is selected from a menu of set-up functions presented at display device 82 when the control 80 is set to the "set-up" mode of operation. FIG. 2 represents a menu of items presented on selection of "CONFIGUATION" from the set-up menu. Selection of the "Audio/Visual" function from the menu of FIG. 2 results in display of a "RECORD" display screen illustrated by FIG. 3. The RECORD display screen enables a user to control recording of audio, video or still image information by operating pushbutton displays 200, 202 and 204 respectively.

Figure 3B:
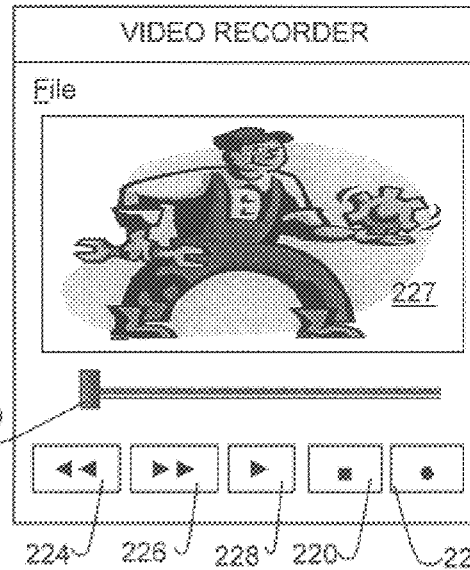
Figure 3:
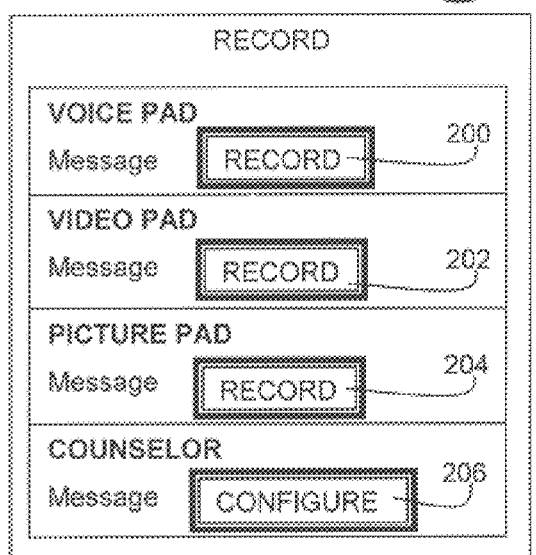
Figure 3C:
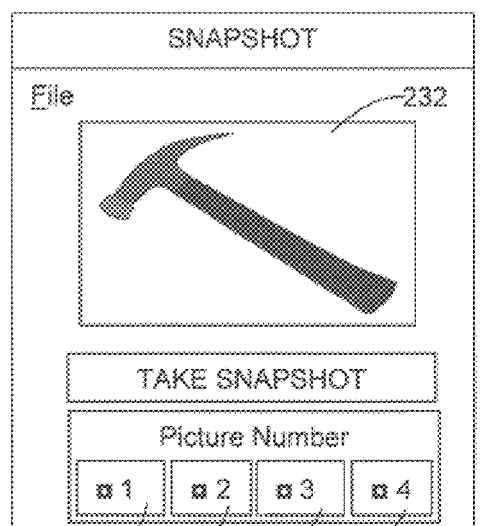
Figure 3A:
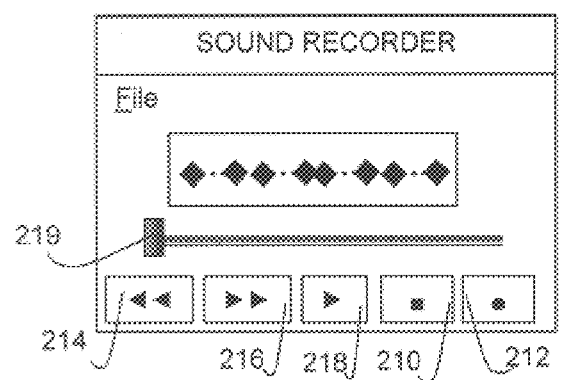

Operation of pushbutton display 200 of FIG. 3 causes execution of audio programs 142 which present display of an audio record/replay control display screen illustrated by FIG. 3a advantageously presented as an inset in FIG. 3. Audio programs 142, for example the SOUND RECORDER programs comprising certain WINDOWS operating system programs, control temporary storage of digitized representations of sound produced by audio interface 132 in response to signals input by microphone 122. Temporary storage may be within memory located within audio interface 132, within RAM 84 or on disk memory 86. Advantageously, the audio recording programs create files conforming to standardized file descriptors for audio information such as "WAV" files. To begin recording, the user operates the "Record" pushbutton display 212 of FIG. 3a. To halt recording, the user operates the "Halt" pushbutton display 210. The recording held in temporary storage may be replayed for review using replay control pushbutton displays for "rewind" (pushbutton display 214) to return through the recording towards its beginning, "fast forward" (pushbutton display 216) to advance through the recording towards its end, and "play" (pushbutton display 218). In addition, slider display 219 may be used to select a starting point within a recording from which replay will begin. Once a satisfactory recording has been completed, the complete record of digitized signals may be transferred from temporary storage to, for example, disk memory 86 using features of audio recording programs 142 for saving files, for example the File Save facilities of the WINDOWS Sound Recorder programs. Advantageously, the File Save function associates files with a temporary storage directory associated with the set-up mode of operation of control 80.

Operation of pushbutton display 202 of FIG. 3 causes execution of video recording programs 140, implementing video capture functions created from, for example, facilities of the VIDEO FOR WINDOWS library of programs. Manual control of video recording is provided through a "dialogue box" created using facilities of libraries of VISUAL C++ programs and including manual control functions illustrated by the video recording control display screen of FIG. 3b. Video recording programs 140 control temporary storage of digitized signals available from video interface circuits 130. Advantageously the video recording programs 140 create files conforming to standardized file descriptors for video information such as "AVI" files. Temporary storage for digitized video information may be provided within video camera interface circuitry 130, within RAM 84 or on disk memory 86. Images from video camera 162 to be recorded are presented in display area 227. To begin recording, the user operates the "Record" pushbutton display 222. To halt recording, the user operates the "Halt" pushbutton display 220. Video information recorded in this manner represent time sequential video images suitable for depicting motion subject to limitations of the rate at which image data is "captured" and recorded. The recording held in temporary storage may be replayed for review using replay control pushbutton displays for "rewind" (pushbutton display 224), "fast forward" (pushbutton display 226) and "play" (pushbutton display 228). In addition, slider display 229 may be used to select a starting point within a recording for replay. Once a satisfactory recording has been completed, the complete record of digitized signals may be transferred from temporary storage to, for example, disk memory 86 using features of video recording programs 140 for saving files, for example the File Save facilities of libraries of VISUAL C++ programs comprising machine control programs 96. Advantageously, the File Save function associates files comprising the video recording with a temporary storage directory associated with the set-up mode of operation of control 80.

Operation of pushbutton display 204 of FIG. 3 causes execution of still image recording ("snapshot") programs 144 which effect presentation of a snapshot control display screen illustrated by FIG. 3c. For implementation of a snapshot recording function represented by snapshot recording programs 144 of FIG. 1, applicants have used video capture facilities of the VIDEO for WINDOWS library of programs. In addition, applicants have used format conversion routines of the INTEL JPEG library of programs to convert the bitmap image of captured video information to a JPEG file format. Manual control of still image capture is provided through a "dialogue box" created using facilities of libraries of VISUAL C++ programs and including manual control functions illustrated by the Snapshot control display screen of FIG. 3c. Snapshot recording programs 144 control temporary storage of digitized signals available from video interface circuits 130. Video images from camera 162 are continuously displayed in image display area 232. The user operates a desired one of picture number pushbutton displays 230 when a desired image appears in the display area 232. The image information presented at the time of operation of the selected pushbutton display is temporarily stored in memory associated with the selected "picture number" as a single image. Once the desired images have been recorded, the recordings may be transferred from temporary storage to, for example, disk memory 86 using features of snapshot recording programs 144 for saving files, for example File Save facilities of libraries of VISUAL C++ programs comprising machine control programs 96. Advantageously, the File Save function associates files with a temporary storage directory associated with the set-up mode of operation of control 80.

Programs comprising set-up programs 110 provide facilities for saving mold (tooling) data files to create an association between saved files and a unique tooling identifier. All saved audio, video and snapshot image files resident under the temporary storage directory as described are "transferred" to be resident under a tooling (mold data) storage directory upon "saving" a mold data file. This "transfer" of audio, video and snapshot image files has the effect of restricting access via the notepad function to only those files associated with the tooling (mold data) identifier active at the time the notepad function is selected. In addition to recording audio and video information as described, control 80 permits storage of existing audio, video and snapshot files supplied via, for example, a data communication interface. Using for example, File Save features of WINDOWS programs, such files may be stored in association with selected unique tooling (mold data) identifiers already stored in control 80. The "saved" audio, video and snapshot files are "transferred" to reside under the identified mold data directory of the unique identifier.

Presentation and Replay

Once saved, audio, video and still image files can be retrieved for presentation by presentation devices comprising control 80. As used in this description and the appended claims, "audio/video presentation devices" shall mean and refer to individually devices for presentation of audio information and devices for presentation of video information and shall mean and refer to devices which are suitable for presentation of both audio and video information simultaneously. With reference to FIG. 1, speaker 124 represents an audio presentation device and display screen 82 represents a video presentation device.

Figure 4:
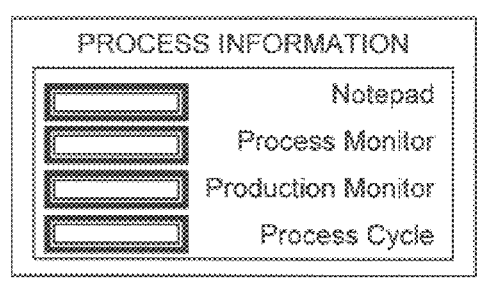
FIGS. 4–5b are illustrations of screen displays of the control of FIG. 1 related to manual control of presentation of audio and video information.

With control 80 in the set-up mode of operation, an electronic notepad function for manually controlled presentation of audio/video information is accessible by selection of a "PROCESS INFORMATION" item from a set-up menu presented on display device 82. FIG. 4 represents a menu of items presented on selection of PROCESS INFORMATION from the set-up menu. The notepad function is not operative until a mold file identifier has been entered. Once a mold file identifier has been entered, all notepad files associated with the identified mold file are accessible using features of the notepad function. Selection of "NOTEPAD" from FIG. 4 results in presentation of the electronic notepad control display screen illustrated by FIG. 5. Previously recorded audio, video and snapshot image files are replayed by operating pushbutton displays 240, 242 and 244, of FIG. 5, respectively to select the information type (audio, video, snapshot) to be presented. Only those files which are associated with the then active tooling identifier are accessible via the electronic notepad function.

Figure 5:
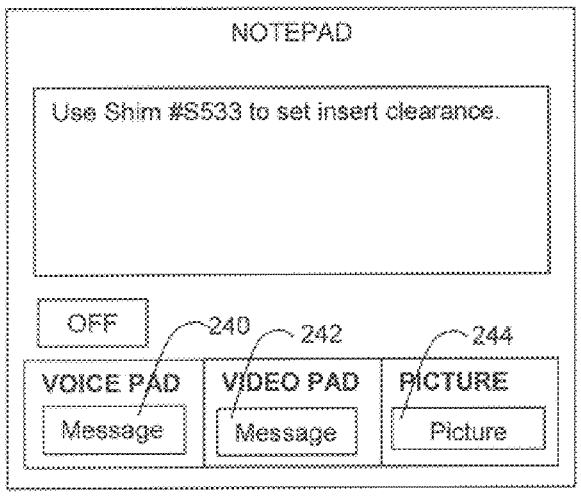

Operation of pushbutton display 240 of FIG. 5 causes execution of audio programs 142 which present display of the audio play/record control display screen illustrated by FIG. 3a. On initiation of audio programs 142, the files of previously stored audio information associated with the then active tooling identifier are retrieved and processed to extract and transfer digitized audio information to a digital-to-analogue converter associated with a speaker for reproduction of sound. Advantageously, the digital-to-analogue converter and signal conditioning circuitry are available on a conventional "sound card" which may also provide a speaker or connections for speakers remotely located. To pause or halt replay, the user operates the "Halt" pushbutton display 210 of FIG. 3a. Other replay control functions previously described with reference to FIG. 3a are also enabled for manual control of presentation of audio information.

Figure 5A:
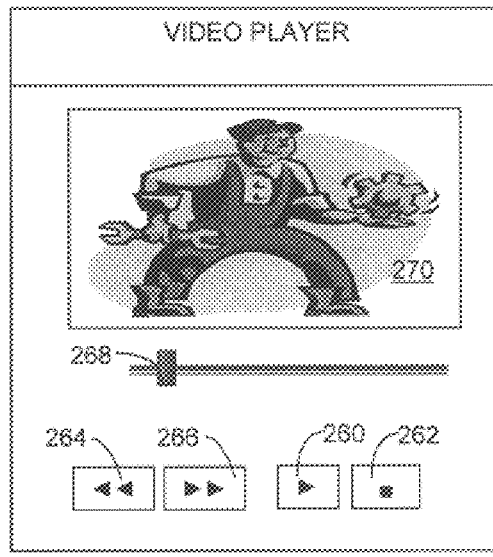

Operation of pushbutton display 242 of FIG. 5 causes execution of video replay programs 148 which present display of a video replay control display screen illustrated by FIG. 5a. Applicants have implemented video replay programs 148 using facilities of the MEDIA CONTROL INTERFACE library of programs comprising certain WINDOWS operating system programs. Manual control of video replay is provided through a "dialogue box" presented on display device 82 and created using facilities of libraries of VISUAL C++ programs and including manual control functions illustrated by the video replay control display screen of FIG. 5a. On initiation of video replay programs 148, stored video files associated with the then active tooling identifier are retrieved and processed for presentation on display device 82. Video images are presented within video display area 270 of FIG. 5a. To pause or halt replay, the user operates the "Halt" pushbutton display 262. Other replay control functions to permit manual control of presentation of video information are provided including, Rewind (pushbutton display 264) to return through the video information file towards its beginning, Fast Forward (pushbutton display 266) to advance through the video information file towards its end, and slider 268 to manually select a point within a video information file from which presentation is to begin.

Figure 5B:
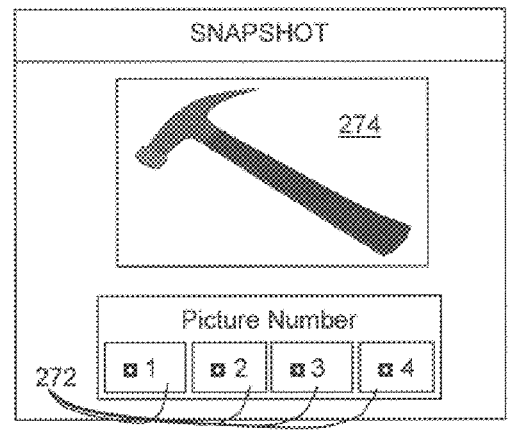

Operation of pushbutton display 244 of FIG. 5 causes execution of snapshot view programs 164 which present display of a snapshot view control display screen illustrated by FIG. 5b. Applicants have chosen to use JPEG library programs represented as snapshot view programs 164 of FIG. 1 and available from Intel to control presentation of selected still images on display device 82. Snapshot view programs 164 control retrieval of the file of previously recorded snapshots and convert the JPEG format still image (snapshot) files to bitmap image data for presentation on display device 82. To select a snapshot for display, the user operates the desired "Picture Number" pushbutton display 272 of FIG. 5b to effect presentation of a snapshot in display area 274 of FIG. 5b.

Electronic Counselor

As is conventional, control of machine 10 is effected by monitoring conditions of devices as represented by electrical signals available at machine input/output interface circuits 150 and processing control algorithms defining logical and arithmetic relationships of device conditions, desired machine functions and control signals for controlling operation of elements of the machine and associated equipment. Machine control programs 96 comprise routines for effecting control according to the mode of operation of the machine, i.e. "set-up" or "automatic" and using such control algorithms. As is well known in the art of machine control, status signals are used to represent the result of processing certain control algorithms. The status signals may, consequently, represent the results of comparisons of measured values with limit values, expiration of predetermined time intervals from the occurrence of particular events, or results of logic functions representing particular combinations of device conditions. For example, programmed monitoring routines are known that compare values measured by sensors against predetermined limits and set status signals to indicate that the limit values have been exceeded. Typical of plastics processing machines, monitoring routines are used to indicate when temperature measurements relevant to material processing temperatures exceed limit values.

Considering machine 10, sensors 50 at barrel 60 are used to measure temperature indicative of the temperature of material being plasticized within barrel 60 Fault detection routines compare values of temperature sensed by sensors 50 against upper and lower limit values, and, in accordance with well known methods, set a status signal in response to detection of a measured value in excess of a limit. Machine control programs 96 may respond to the status signal by sounding an alarm and/or energizing a visual indicator. As an enhancement of known machine control responses to predetermined values of status signals, the present invention permits automated presentation of audio/video information.

Audio and video information to be presented in response to conditions of status signals can be recorded using facilities of the set-up mode of operation of control 80. In particular, with reference to FIG. 3, association of information to be recorded with a particular status signal is begun with operation of pushbutton display 206 ("CONFIGURE").

Figure 6:
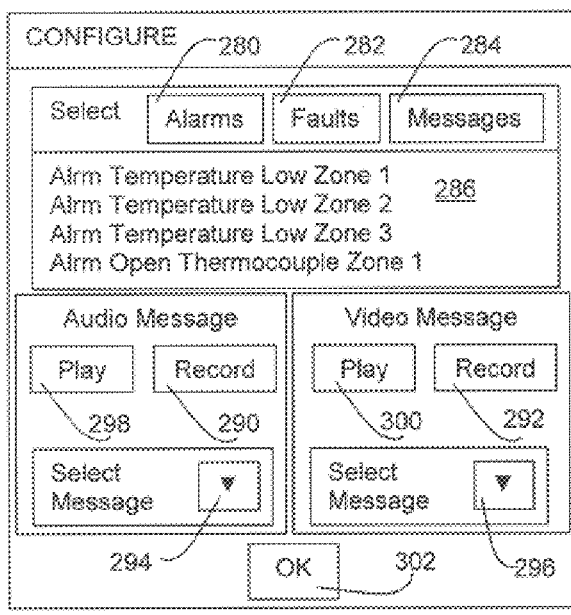
FIG. 6 is an illustration of a screen display of the control of FIG. 1 for associating audio and video information with status signals representing particular conditions of the machine of FIG. 1.

Electronic Counselor programs 160 cause the presentation of a "dialogue box" screen display illustrated by FIG. 6 permitting selection of an existing status signal by name and recording of audio and video information to be associated with the selected status signal. In the preferred embodiment, plural categories of status signals are accommodated, characterized as "Alarms", "Faults" and "Messages", each category being selectable by operation of pushbutton displays 280, 282, and 284, respectively. A list of status signal names for the selected category is presented in list space 286. The desired status signal name is "highlighted" by, for example, operation of pointing device 118. With the desired status signal name highlighted, information recording can be effected by controls of the "Audio Message" and "Video Message" screen segments, particularly, RECORD pushbutton displays 290 and 292, respectively. Alternatively, an existing video information file can be associated with the status signal using the list control pushbutton displays 294 and 296, respectively.

In response to operation of either RECORD pushbutton display 290 or 292, Electronic Counselor programs 160 cause the execution of audio programs 142 or video recording programs 140, as appropriate. Recording and saving of files of recorded information is performed as previously described with reference to FIGS. 3a and 3b with the additional function of association of the saved audio/video information file with the highlighted status signal name. In response to operation of either pushbutton display 294 or 296, a list of file names of, respectively, resident audio and video information files will be "scrolled" for selection by the user. Using, for example, mouse 118, a desired recording file name is highlighted. Once the desired audio and/or video files have been recorded and/or selected the control display screen of FIG. 6 is closed by operation of OK pushbutton display 302.

While the CONFIGURE screen display is presented, audio and video recordings may be replayed for review using the PLAY pushbutton displays 298 and 300 of FIG. 6. In response to operation of either PLAY pushbutton displays 298 or 300 of FIG. 6, Electronic Counselor programs 160 cause execution of audio programs 142 or video replay programs 148, as appropriate. Control of replay of recorded information is performed as previously described with reference to FIGS. 3a and 5a.

Once audio/video information files have been stored using the Electronic Counselor function, the occurrence of a particular condition of a status signal for which such files have been stored will initiate presentation of audio and video information from the stored files. For example, in response to the setting of a status signal to indicate that temperature sensed by sensor 50 has exceeded a limit value, monitoring routines comprising machine control programs 96 will initiate execution of audio programs 142 and video replay programs 148 as appropriate to effect presentation of audio/video information, selecting the stored files of audio/video information according to the status signal. Advantageously, start of presentation may be deferred until an operator has responded to an attention indicator, such as an alarm bell, light or the like, in a predetermined manner.

What is claimed is:

1. A program controlled machine wherein signals produced in response to execution of programs control operation of machine devices, the programs being executed by a control comprising:
   a) a processor;
   b) audio/video presentation devices for presentation of audio/video information; and
   c) data storage wherein are stored;
      i) first programs executable by the processor for controlling the operation of machine devices, the first programs comprising monitoring programs to detect occurrence of particular events in connection with control of the machine, the occurrence of an event being indicated by the value of a status signal representing the event;
      ii) second programs executable by the processor for enabling storage of audio/video information files in association with selected status signals; and
      iii) third programs executable by the processor for controlling the presentation by the audio/video presentation devices of selected audio/video information from the stored files;
   wherein the monitoring programs are effective to select audio/video information files for presentation of audio/video information in response to detection of occurrence of particular events.

2. The machine of claim 1 wherein the first programs further comprise set-up programs associated with a manual mode of operation of the machine, the set-up programs effecting execution of the third programs to permit manually controlled presentation of selected audio/video information.

3. The machine of claim 1 wherein the second programs enable manually controlled recording of audio/video information and the third programs enable replay of the recorded information.

4. The machine of claim 1 wherein the second programs enable manually controlled recording of audio information and the third programs enable replay of the recorded information.

5. The machine of claim 1 wherein the second programs enable manually controlled recording of video information representing time sequential video images and the third programs enable replay of the recorded information.

6. The machine of claim 1 wherein the second programs enable manually controlled recording of video information representing single video images and the third programs enable replay of the recorded information for presentation of selected single video images.

7. The machine of claim 1 wherein the monitoring programs control operation of indicators in response to predetermined values of selected status signals and the execution of the third programs is delayed until detection of a manual response to indicators operated in response to the selected status signal.

8. The machine of claim 1 wherein the third programs permit manual control of presentation of audio/video information.

9. The machine of claim 2 wherein the set-up programs comprise tooling data storage facilities permitting storage of data in association with a unique tooling identifier and the set-up programs are responsive to an active unique tooling identifier to select audio/video information files for presentation.

10. The machine of claim 2 wherein the set-up programs permit manual selection of audio/video information type for presentation.

11. The machine of claim 7 wherein the second programs further enable manually controlled recording of audio/video information and the third programs enable replay of the recorded information.

12. The machine of claim 8 wherein the third programs permit manually controlled advance through a file of audio/video information towards its end during presentation of audio/video information.

13. The machine of claim 11 wherein the second programs enable manually controlled recording of audio information and the third programs enable replay of the recorded audio information.

14. The machine of claim 12 wherein the third programs permit manually controlled return through a file of audio/video information towards its beginning during presentation of audio/video information.

15. The machine of claim 12 wherein the third programs permit manually controlled interruption of presentation of audio/video information.

16. The machine of claim 12 wherein the third programs permit manually controlled selection of a starting point of presentation from within a file of audio/video information.

17. The machine of claim 13 wherein the second programs enable manually controlled recording of video information and the third programs enable replay of the recorded video information.

* * * * *